(12) United States Patent
Tofighbakhsh et al.

(10) Patent No.: US 8,649,776 B2
(45) Date of Patent: Feb. 11, 2014

(54) SYSTEMS AND METHODS TO PROVIDE PERSONAL INFORMATION ASSISTANCE

(75) Inventors: Mostafa Tofighbakhsh, Cupertino, CA (US); Kaveh Hushyar, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 391 days.

(21) Appl. No.: 12/353,133

(22) Filed: Jan. 13, 2009

(65) Prior Publication Data

US 2010/0178903 A1 Jul. 15, 2010

(51) Int. Cl.
*H04M 3/42* (2006.01)

(52) U.S. Cl.
USPC .............. 455/414.1; 455/415; 455/550.1; 455/556.1; 455/556.2

(58) Field of Classification Search
None
See application file for complete search history.

(56) References Cited

U.S. PATENT DOCUMENTS

| 2004/0109587 | A1* | 6/2004 | Segawa et al. | 382/115 |
| 2005/0275714 | A1* | 12/2005 | Ishikawa et al. | 348/14.02 |
| 2006/0013446 | A1* | 1/2006 | Stephens | 382/115 |
| 2008/0075433 | A1* | 3/2008 | Gustafsson | 386/96 |
| 2009/0051648 | A1* | 2/2009 | Shamaie et al. | 345/156 |
| 2009/0298529 | A1* | 12/2009 | Mahajan | 455/550.1 |
| 2009/0324022 | A1* | 12/2009 | Sangberg et al. | 382/118 |

* cited by examiner

*Primary Examiner* — Suhail Khan
(74) *Attorney, Agent, or Firm* — Hartman & Citrin LLC

(57) ABSTRACT

Systems and methods are provided to present information to assist an individual during social activities. For example, in response to a certain user gesture, or keywords in a voice conversation, a mobile device based system may capture audio and/or visual information to formulate an automated search to retrieve information for assisting the user privately. For example, the face or the voice of another user can be captured to search for the name of that user to provide name assistance.

17 Claims, 4 Drawing Sheets

SYSTEMS AND METHODS TO PROVIDE PERSONAL INFORMATION ASSISTANCE

FIELD OF THE TECHNOLOGY

At least some embodiments of the disclosure relate to information technology in general and, more particularly but not limited to, assistance via providing information.

BACKGROUND

A personal digital assistant (PDA) is typically a handheld device that can store and organize personal information for a user. For example, a PDA may store contact information, such as addresses and phone numbers of friends. For example, a PDA may organize calendar information, such as appointments, meetings, etc. For example, a PDA may store notes in text, record a voice message, take a photo, etc.

Some PDAs are integrated with cellular phones as smart phones. The portability and the rich functionalities of smart phones can provide great assistance to the user in daily life. For example, using a smart phone, a user can search for a phone number of a friend in an address book, make a phone call to the friend, and record an appointment or meeting.

Some PDAs can further provide navigation assistance using an integrated Global Positioning System (GPS) receiver; and some PDAs further have wireless communications capabilities for accessing Internet, such as browsing web pages, receiving and sending emails, etc.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

One embodiment of the disclosure provides systems and methods to present information for assisting an individual during social activities. For example, in response to a certain user gesture or keywords in a voice conversation, a mobile device based system may capture audio and/or visual information to formulate an automated search to retrieve information and to assist the user privately. For example, the mobile device may capture the face or the voice of a person to search for the name of the person to provide name assistance.

People can now communicate and interact with more people than ever before. It is sometimes hard for individuals to place a relationship and remember names when they see a person again in virtual or live social settings.

In one embodiment of the disclosure, a mobile system of a user can send a picture of a person, or send some other characteristic of the person a user meets or sees again, to a data mining server to search for information related to that person, such as the name of the person, previous interactions between the user and the person, recent activities of the person, etc.

In some embodiments, the mobile system communicates with a remote name disclosure server to look up the name of the person. In some embodiments, the mobile device may store the information for looking up the name and may not rely upon a remote server.

Figure 1:
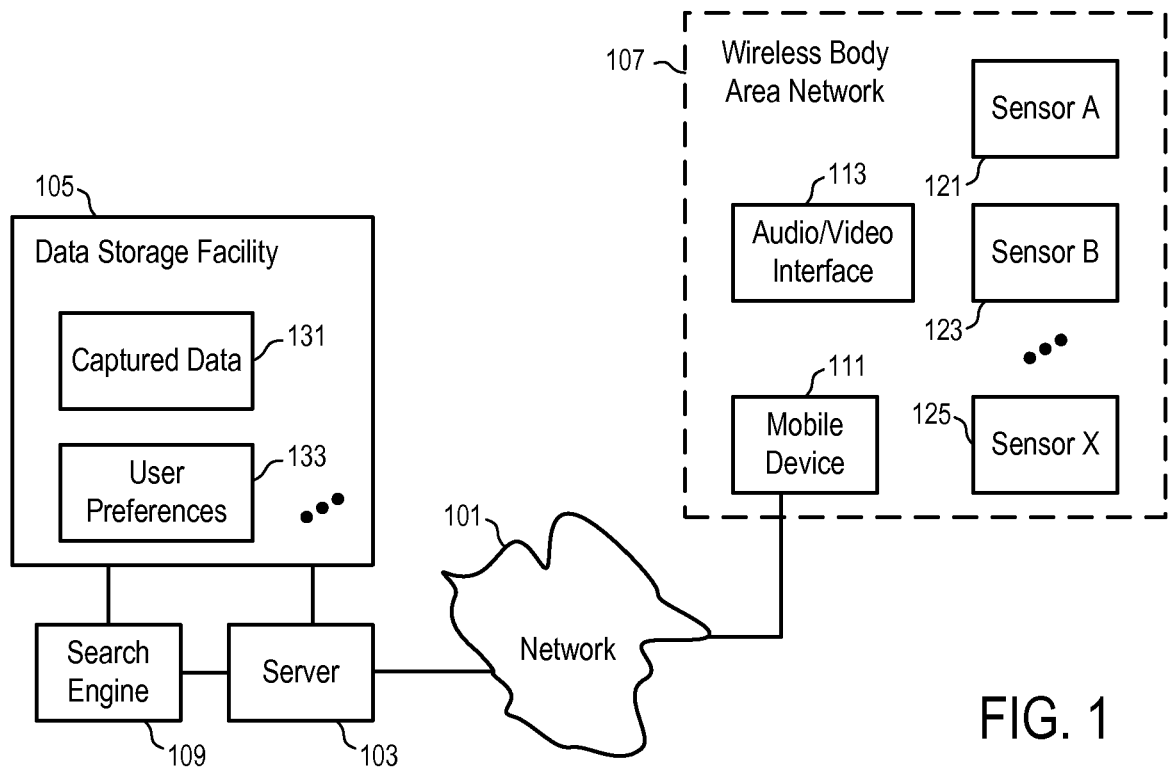
FIG. 1 shows a system to provide personal information assistance according to one embodiment.

FIG. 1 shows a system to provide personal information assistance according to one embodiment. In FIG. 1, a mobile device (111) communicates with a set of sensors (121, 123, . . . , 125) and at least one audio/video interface (113) via a wireless body area network (107), such as a wireless communications network according to IEEE (Institute of Electrical and Electronics Engineers) standard 802.15.6.

Alternatively, the mobile device (111) may be connected to some or all of the sensors (121, 123, . . . , 125) and/or the audio/video interface (113) via wired connections. In some embodiments, some or all the sensors (121, 123, . . . , 125) and/or the audio/video interface (113) may be in the same housing of the mobile device (111).

In FIG. 1, the sensors (121, 123, . . . , 125) can capture audio and/or visual information surrounding the person carrying the mobile device (111). For example, the sensors (121, 123, . . . , 125) may include an image sensor to take a still image, or a video, of what the person is currently looking at. For example, the sensors (121, 123, . . . , 125) may include an audio sensor to capture a clip of voice communications near the person. For example, the sensors (121, 123, . . . , 125) may include a motion sensor to detect a gesture of the person to initiate the capturing of audio and/or visual information.

In one embodiment, at least some of the sensors (121, 123, . . . , 125) are wearable devices. For example, the sensors (121, 123, . . . , 125) may be wearable on the clothing of the user or, in some embodiments, be integrated within the clothing of the user.

In one embodiment, the mobile device (111) coordinates the operations of the sensors (121, 123, . . . , 125). For example, the mobile device (111) may instruct one of the sensors (121, 123, . . . , 125) to capture audio or visual information, in response to a detected gesture of the person. For example, the mobile device (111) may instruct one of the sensors (121, 123, . . . , 125) to capture an image, in response to detecting a keyword or phase in a monitored stream of audio information captured by another of the sensors (121, 123, . . . , 125).

The mobile device (111) may further process the information provided by the sensors (121, 123, . . . , 125). For example, the mobile device (111) may pre-process the audio or visual information captured by the sensors (121, 123, . . . , 125) to discard certain information and reduce the amount of data for storage, or for communication to a remote server (103).

In some embodiments, the mobile device (111) may perform a search locally using the data stored on the mobile device (111). Alternatively, or in combination, the mobile device (111) may communicate with the remote serer (103) over the network (101) to perform the search.

In FIG. 1, the network (101) may include a local area network, a wireless data communication network, a telephone network, a cellular communication network, a telecommunication network, an interactive television network, a packet network, an Internet Protocol Television (IPTV) network, an intranet, or a combination of networks, such as Internet.

In some embodiments, the mobile device (111) includes a cellular phone; and the mobile device (111) can communicate with the remote server (103) via a wireless wide area network and/or a wireless local area network.

In FIG. 1, a remote system, including the data storage facility (105), the search engine (109) and the server (103), has more computational power and storage than the mobile device (111).

The mobile device (111) may transmit the captured data (131) to the server (103) for storage in the data storage facility (105). The search engine (109) can use the captured data (131) to search for information requested by the user. In some embodiments, the search engine (109) performs customized searches based on user preferences (133).

For example, when a user of the mobile device (111) meets a person initially, the user may capture a photo image of the person and a name of the person for storage in the data storage facility (105). When the user subsequently meets the person and needs name assistance, the user may use the mobile device (111) to capture another photo image of the person to initiate a search via the search engine (109). The search engine matches the photo images to search for the name of the person and provides the search result to the mobile device (111). For example, the search engine extracts the facial characteristics from the photo images and matches the images based on the extracted characteristics. The audio/video interface (113) presents the name of the person to the user (e.g., privately via an earphone or via a display integrated within eyeglasses).

For example, the audio/video interface (113) may include an earphone to provide the name of the person in an audio form. For example, the name of the person may be previously captured in the data storage facility (105) in text; and a text to speech unit of the mobile device (111) or the server (103) may convert the name into voice for the earphone. For example, the user may attach a name to the captured photo image of the person, during a review session of the captured images shortly after the initial meeting with the person.

Alternatively, the name of the person may be recorded previously when the user meets the person. For example, the user may use a hand gesture (e.g., hand shaking with the person) to cause one of the sensors (121, 123, . . . , 125) to trigger the mobile device to record the name, when the name of the person is spoken during the introduction of the person to the user. Alternatively, the mobile device (111) may monitor the conversation in the introduction between the user and the person to detect phases such as "name is" to record the name of the person.

In another example, the audio/video interface (113) may include a display integrated within eyeglasses. The mobile device (111) may provide the name for presentation on the integrated display. Such a presentation can provide an augmented reality experience, in which the reality as seen through the semitransparent glasses is augmented with the visual information displayed, such as the name of the person and/or other information related to the person.

In some embodiments, a miniature camera (and/or a voice recorder) is also integrated with the eyeglasses to capture images (and/or voices).

In one embodiment, the server (103) provides a service for instant and discrete memory assistance. Users may upload information about people they meet and/or subscribe to a real time service to determine who is who. Further, businesses, organizations, or government entities may also use such a service (e.g., internally) to help their employees and executives (e.g., in large meeting settings, in social environments, in law enforcement and security settings, etc.). In some embodiments, such a service can be used to enhance social network experiences.

Figure 2:
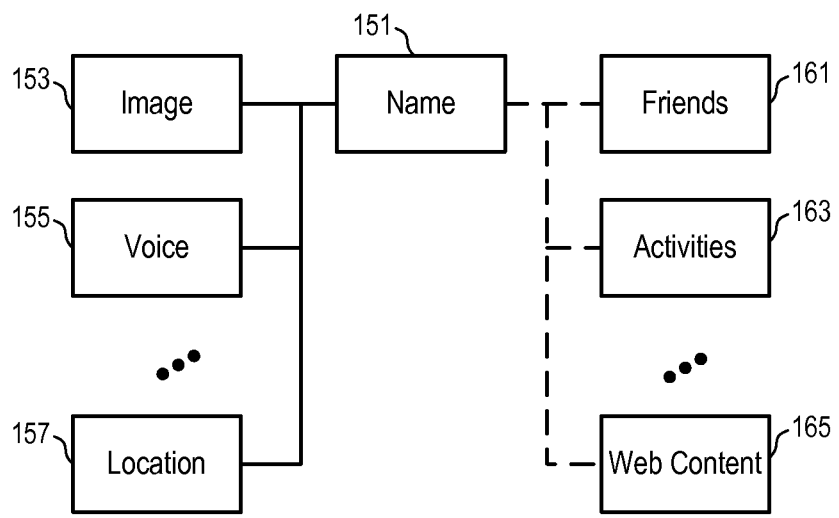
FIG. 2 shows a method to organize information to provide assistance according to one embodiment.

FIG. 2 shows a method to organize information to provide assistance according to one embodiment. In FIG. 2, the data storage facility (105) (or the mobile device (111)) associates the captured information, such as images (153), voices (155), and locations (157), with the name (151) of a person.

In FIG. 2, the name (151) may be an audio clip recorded by a sensor (e.g., 121, 123, . . . , or 125). The user may speak the name to record the name (151), or provide a gesture to cause a sensor (e.g., 121, 123, . . . , or 125) to record the name, or provide the name via typing into to the mobile device (111) (e.g., in a session of reviewing the captured images or voices).

In one embodiment, the data storage facility stores the photo images (153) or voice recordings (155). Alternatively, the server (103) and/or the mobile device (111) may process the original photo images (or voice recordings) to extract facial characteristics for facial recognition (or voice characteristics for person identification via voice).

In some embodiments, a GPS receiver (or other location determining unit) of the mobile device (111) determines the location (157) of the capturing of the image (153) and/or the voice (155). Based on the user preferences (133), the server (103) may also provide the location (157) associated with the name (151) to refresh the memory of the user.

In some embodiments, the name (151) is further associated with social network information, such as friends (161), activities (163), and web content (165), etc. The search engine (109) may access Internet, or other databases, to search social network information and web information, based on the name (151) and/or the user preferences (133). Based on the user preferences (133) and/or the explicit requests from the user (e.g., detected by the sensors (121, 123, . . . , 125)), the search engine (109) may identify a portion of the information (e.g., 161, 163, . . . , 165) to assist the user.

Figure 3:
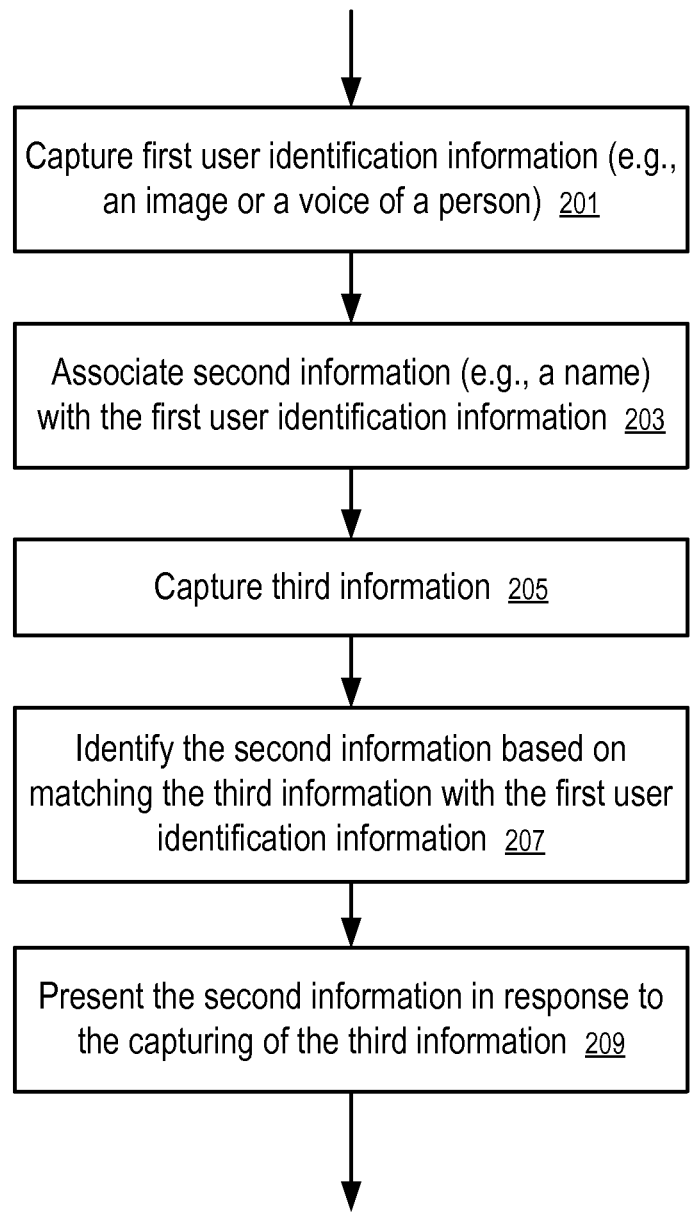
FIG. 3 shows a method to provide information assistance according to one embodiment.

FIG. 3 shows a method to provide information assistance according to one embodiment. In FIG. 3, a server (103) captures (201) first user identification information (e.g., an image (153) or a voice (155) of a person, or other information that shows the characteristics of a user) via a mobile device (111) and/or a sensor (e.g., 121, 123, . . . , or 125). The data storage facility (105) associates (203) second information (e.g., a name (151)) with the first user identification information. In response to capturing (205) third information, the search engine (109) identifies the second information, including a name of a person, based on matching the third information with the first user identification information. The server (103) then provides the second information to the mobile device (111) to present (209) the second information via the audio/video interface (113), in response to the capturing of the third information.

In one embodiment, the third information includes non-text information, such as image or voice; and the search engine performs characteristic matching for image and voice to identify the second information.

In some embodiments, the mobile device (111) performs at least part of the operations of matching image or voice.

Figure 4:
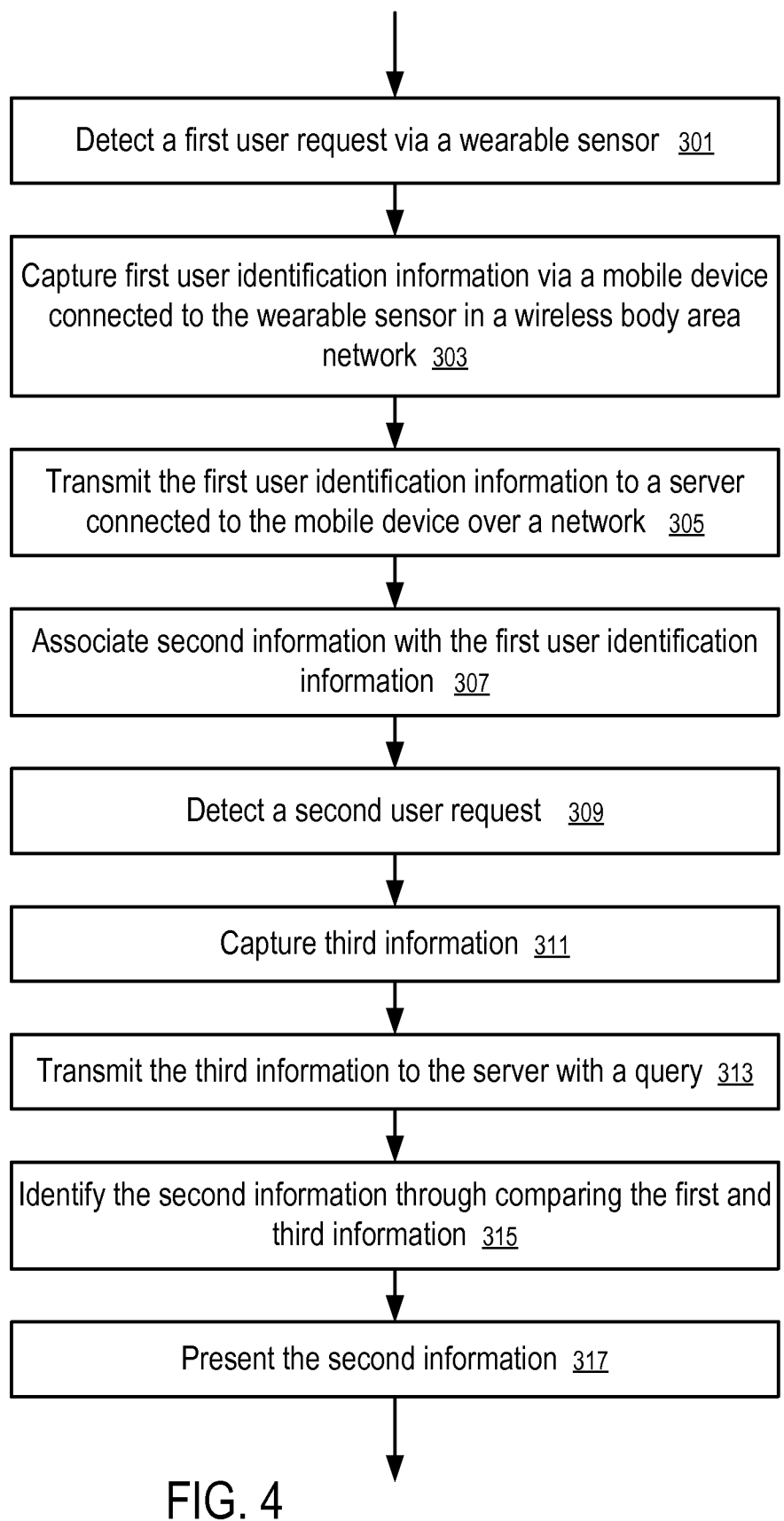
FIG. 4 shows an example of providing information assistance according to one embodiment.

FIG. 4 shows an example of providing information assistance according to one embodiment. In FIG. 4, a wearable sensor (e.g., 121, 123, . . . , 125) detects (301) a first user request. In response to the first user request, the mobile device (111) captures (303) first user identification information via a wearable sensor (e.g., 121, 123, . . . , 125) connected to the mobile device (111) in a wireless body area network (107).

The mobile device (111) transmits (305) the first user identification information to a server (103) that is connected to the mobile device over a network (101). The data storage facility (105) associates (307) second information (e.g., the name of a person) with the first user identification information (e.g., a photo image of the person, or the voice of the person).

A wearable sensor (e.g., 121, 123, . . . , 125) may subsequently detect (309) a second user request (e.g., during a subsequent meeting of the user with the person). The mobile device (111) captures (311) third information (e.g., a current photo image of the person, or the current voice of the person) and transmits (313) the third information to the server (103) with a query for the search engine (109).

In one embodiment, the mobile device (111) formulates the query. Alternatively, the sever (103) formulates the query based on the user preferences (133).

The search engine (109) identifies (315) the second information (e.g., the name of the person) through comparing the first and third information (e.g., through face recognition, or through identifying a person via voice characteristics).

The server (103) then presents (317) the second information to the user via the mobile device (111) and the audio/video interface (113).

For example, in response to a user indication, or a keyword (or phrase) in a voice conversation, the mobile device (111) may control a personal camera (e.g., associated with sensor (121)) to zoom on the person the user needs more information. Based on the image captured by the camera, the mobile device (111) can get name assistance over the network (101) from the server (103). The media information captured via the camera is used as an index to locate additional information in other formats, such as the name of the person, the history of interaction with the person, background information about the person, etc.

In one embodiment, the user interface to control the application is based on discrete, embedded devices wearable by the user. The user interface may receive input based on image or voice captured by the wearable devices. The query or request for real time character or object reminders can be though many forms and shapes, such as special phrases or sound, body or hand gestures, etc.

Figure 5:
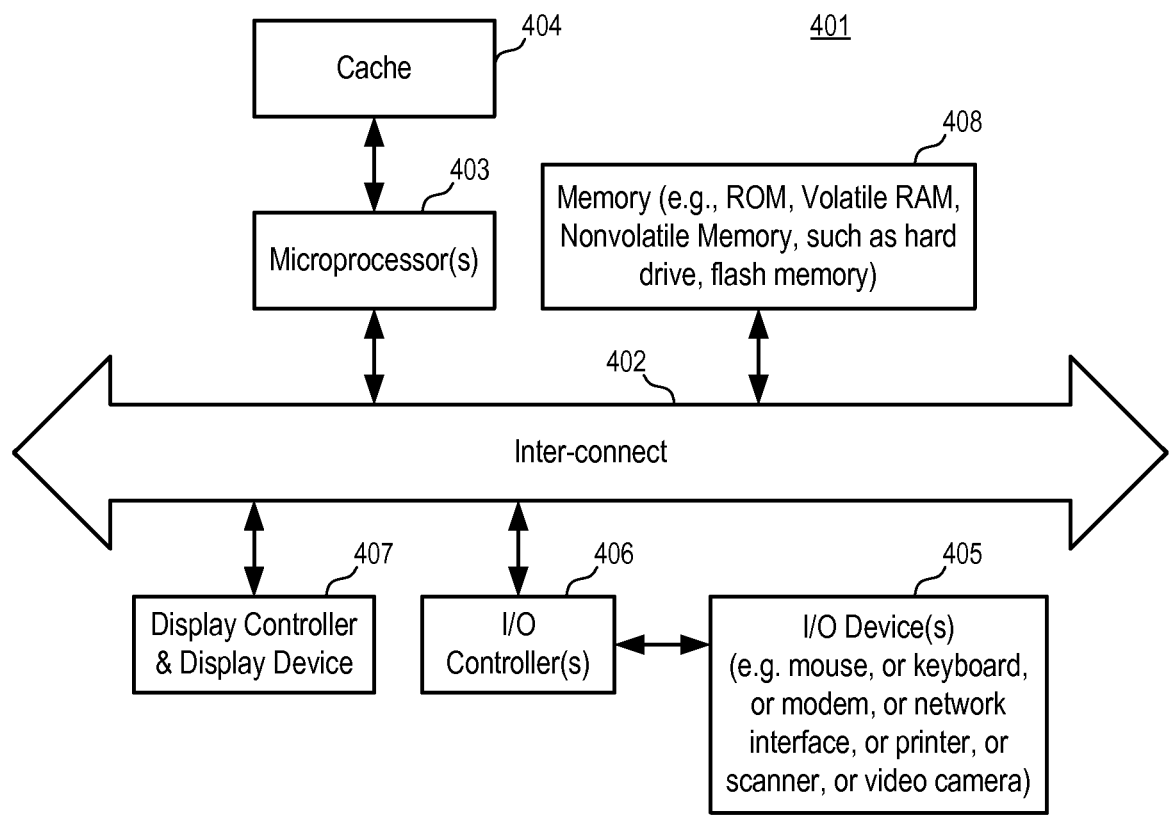
FIG. 5 shows a data processing system, which can be used in various embodiments.

FIG. 5 shows a data processing system, which can be used in various embodiments. While FIG. 5 illustrates various components of a computer system, it is not intended to represent any particular architecture or manner of interconnecting the components. Some embodiments may use other systems that have fewer or more components than those shown in FIG. 5.

In one embodiment, each of the server (103), the data storage facility (105), the search engine (109), the mobile device (111), and the sensors (121, 123, . . . , 125) can be implemented as a data processing system, with more or less components, as illustrated in FIG. 5.

In FIG. 5, the data processing system (401) includes an inter-connect (402) (e.g., bus and system core logic), which interconnects a microprocessor(s) (403) and memory (408). The microprocessor (403) is coupled to cache memory (404) in the example of FIG. 5.

The inter-connect (402) interconnects the microprocessor(s) (403) and the memory (408) together and also interconnects them to a display controller, a display device (407), and to peripheral devices such as input/output (I/O) devices (405) through an input/output controller(s) (406).

Typical I/O devices include mice, keyboards, modems, network interfaces, printers, scanners, video cameras and other devices which are well known in the art. In some embodiments, when the data processing system is a server system, some of the I/O devices, such as printer, scanner, mice, and/or keyboards, are optional.

The inter-connect (402) may include one or more buses connected to one another through various bridges, controllers and/or adapters. In one embodiment, the I/O controller (406) includes a USB (Universal Serial Bus) adapter for controlling USB peripherals, and/or an IEEE-1394 bus adapter for controlling IEEE-1394 peripherals.

The memory (408) may include ROM (Read Only Memory), volatile RAM (Random Access Memory), and non-volatile memory, such as hard drive, flash memory, etc.

Volatile RAM is typically implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data, which when executed by a data processing system, causes the system to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer networks at different times and in different communication sessions or in the same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include, but are not limited to, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

The computer-readable media may store the instructions. The instructions may also be embodied in digital and analog communication links for electrical, optical, acoustical or other forms of propagated signals, such as carrier waves, infrared signals, digital signals, etc.

In general, a tangible machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
   receiving, at a server computer of a remote computing system, user identification information associated with a first user, the user identification information comprising a name of the first user and a photograph of the first user, wherein the photograph is captured by a mobile device associated with a second user, and the photograph comprises identifying characteristics of the first user;
   storing, by a data storage facility of the remote computing system, contact information of the first user in association with the user identification information;
   receiving, at the server computer of the remote computing system, current user identification information through the mobile device, the current user identification information comprising a current photograph of the first user, wherein the current photograph is captured by the mobile device, and the current photograph comprises current identifying characteristics of the first user;
   matching, by a search engine of the remote computing system, the current user identification information with the user identification information;
   in response to matching the current user identification information with the first user identification information, retrieving, by the search engine of the remote computing system, social network information of the first user, the social network information comprising friend information associated with a friend of the first user, activity information associated with an activity of the first user, and web content associated with the first user; and
   causing, by the remote computing system, the mobile device to present the social network information to the second user so that the second user can utilize the social network information during a conversation with the first user.

2. The method of claim 1, wherein the user identification information is captured via a wearable sensor worn by the second user.

3. The method of claim 2, wherein the wearable sensor is connected to the mobile device via a wireless body area network, and receiving, at the server computer of the remote computing system, the user identification information comprises receiving, at the server computer of the remote computing system, the user identification information via a wireless wide area network to which the mobile device is connected.

4. The method of claim 3, wherein the wireless body area network is in compliance with an Institute of Electrical and Electronics Engineers 802.15 standard.

5. The method of claim 3, wherein the mobile device comprises a cellular receiver configured to facilitate connection to the wireless wide area network.

6. The method of claim 3, wherein the wearable sensor detects a hand gesture of the second user to signal the mobile device to capture the current user identification information, and wherein the hand gesture does not relate to interacting with the mobile device.

7. The method of claim 6, wherein the hand gesture comprises a hand shake between the first user and the second user.

8. The method of claim 1, wherein matching, by the search engine of the remote computing system, the current user identification information with the user identification information comprises matching, by the search engine of the remote computing system, the current user identification information with the user identification information utilizing face recognition.

9. The method of claim 1, wherein the current user identification information and the user identification information each comprises an audio clip of a voice that conveys, respectively, further current identifying characteristics and further identifying characteristics of the first user, and matching, by the search engine of the remote computing system, the current user identification information with the user identification information comprises matching, by the search engine of the remote computing system, the current user identification information with the user identification information utilizing face recognition and voice recognition.

10. The method of claim 1, wherein causing, by the remote computing system, the mobile device to present the social network information to the second user comprises causing, by the remote computing system, the mobile device to present the social network information to the second user via an earphone.

11. The method of claim 1, wherein causing, by the remote computing system, the mobile device to present the social network information to the second user comprises causing, by the remote computing system, the mobile device to present the social network information to the second user via a display integrated in eyeglasses.

12. A non-transitory machine readable medium storing instructions that, when executed by a processor, cause the processor to perform operations comprising:
   receiving user identification information associated with a first user, the user identification information comprising a name of the first user and a photograph of the first user, wherein the photograph is captured by a mobile device associated with a second user, and the photograph comprises identifying characteristics of the first user;
   causing contact information of the first user to be stored in association with the user identification information;
   receiving current user identification information through the mobile device, the current user identification information comprising a current photograph of the first user, wherein the current photograph is captured by the mobile device, and the current photograph comprises current identifying characteristics of the first user;
   matching the current user identification information with the user identification information;
   in response to matching the current user identification information with the first user identification information, retrieving social network information of the first user, the social network information comprising friend information associated with a friend of the first user, activity information associated with an activity of the first user, and web content associated with the first user; and
   causing the mobile device to present the social network information to the second user so that the second user can utilize the social network information during a conversation with the first user.

13. The non-transitory machine readable medium of claim 12, wherein matching the current user identification information with the user identification information comprises matching the current user identification information with the user identification information utilizing face recognition.

14. The non-transitory machine readable medium of claim 13, wherein the current user identification information and the user identification information each comprises an audio clip of a voice that conveys, respectively, further current identifying characteristics and further identifying characteristics of the first user, and matching, by the search engine of the remote computing system, the current user identification information with the user identification information comprises matching the current user identification information with the user identification information utilizing face recognition and voice recognition.

15. A remote computing system comprising:
   a processor; and
   a memory in communication with the processor, the memory comprising instructions that, when executed by the processor, cause the processor to perform operations comprising
      receiving user identification information associated with a first user, the user identification information comprising a name of the first user and a photograph of the first user, wherein the photograph is captured by a mobile device associated with a second user, and the photograph comprises identifying characteristics of the first user;
      causing contact information of the first user to be stored in association with the user identification information;
      receiving current user identification information through the mobile device, the current user identification information comprising a current photograph of the first user, wherein the current photograph is captured by the mobile device, and the current photograph comprises current identifying characteristics of the first user;
      matching the current user identification information with the user identification information;
      in response to matching the current user identification information with the user identification information, retrieving social network information of the first user, the social network information comprising friend information associated with a friend of the first user, activity information associated with an activity of the first user, and web content associated with the first user; and
      causing the mobile device to present the social network information to the second user so that the second user can utilize the social network information during a conversation with the first user.

16. The remote computing system of claim 15, wherein matching the current user identification information with the user identification information comprises matching the current user identification information with the user identification information utilizing face recognition.

17. The remote computing system of claim 15, wherein the current user identification information and the user identification information each comprises an audio clip of a voice that conveys, respectively, further current identifying characteristics and further identifying characteristics of the first user, and matching, by the search engine of the remote computing system, the current user identification information with the user identification information comprises matching the current user identification information with the user identification information utilizing face recognition and voice recognition.

* * * * *